Dec. 17, 1968   K. S. SNOW ET AL   3,416,919
METHOD FOR FORMING ELECTRODES
Filed Sept. 18, 1967
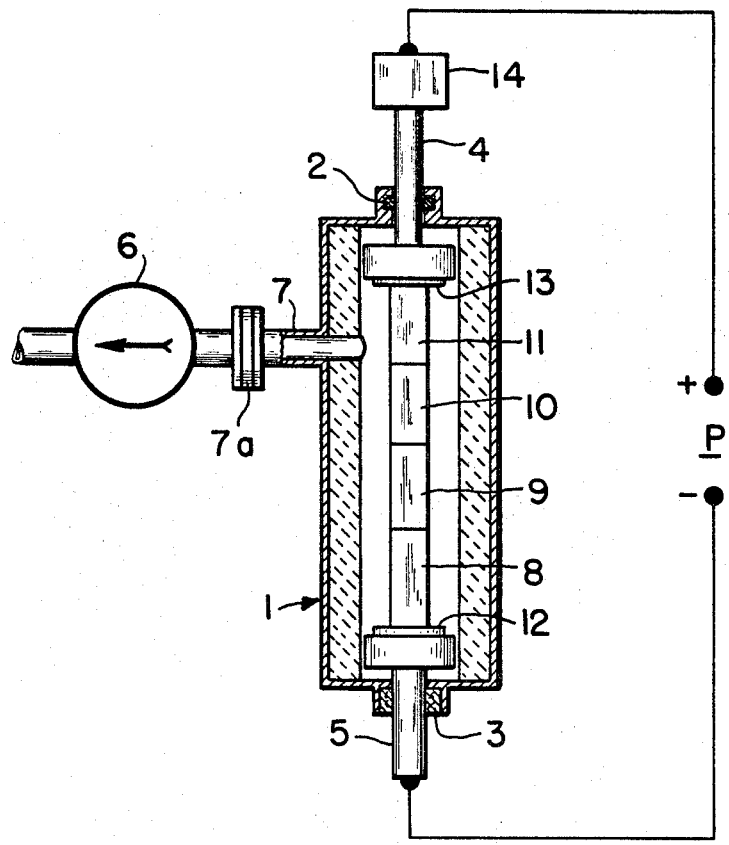
INVENTORS
Karl S. Snow
Schuyler A. Herres
BY
THEIR ATTORNEYS

United States Patent Office 3,416,919
Patented Dec. 17, 1968

3,416,919
METHOD FOR FORMING ELECTRODES
Karl S. Snow, Boulder City, Nev., and Schuyler A. Herres, Murray Hill, N.J., assignors to Titanium Metals Corporation of America, New York, N.Y., a corporation of Delaware
Filed Sept. 18, 1967, Ser. No. 668,464
8 Claims. (Cl. 75—208)

ABSTRACT OF THE DISCLOSURE

Method of forming an electrode from a plurality of pressed metal compacts comprising placing the compacts in a furnace in an arrangement approximating the desired electrode shape with adjacent surfaces in contact, evacuating the furnace and heating the compacts at a temperature above the sintering temperature of the compact material while maintaining the abutting surfaces of the compacts in contact for a sufficient time to sinter the compact material and join the compacts.

---

This invention relates generally to the formation of electrodes for consumable electrode arc melting and more particularly to a method of forming a number of individual pressed metal compacts into a unitary electrode.

It is common practice in the metals industry to form a plurality of pressed compacts with or without a scrap addition into an electrode for consumable arc melting. The compacts are presently joined together to form an electrode of the desired size and shape by various types of fusion welding techniques. Welding in an inert atmosphere chamber is both expensive and awkward, and welding in the open atmosphere with an inert shield gas often results in metal contamination and quality defects. Another problem encountered in electrodes formed by welding a plurality of compacts is that the tensile strength of the pressed compacts is reduced in proportion to the amount of scrap added to the compact material before pressing. Since a minimum tensile strength is required for the electrode, the amount of scrap which can be recycled into the compacts is severely limited.

Our invention provides a novel method of forming a plurality of pressed metal compacts into an electrode which results in an electrode having greater compact strength and joint strength than an electrode formed from pressed compacts joined by fusion welding. Additionally, our invention provides a much less expensive method for forming electrodes since it is not necessary to utilize an inert gas when forming compacts into an electrode as is the case with welding. Another advantage of our method is that it permits the inclusion of a much larger portion of scrap into the compacts without a decrease in tensile strength.

Electrodes formed in accordance with our invention have greater compact strength than the original pressed compacts and greater joint strength than an electrode formed from compacts joined by fusion welding. The reason for the increase in strength apparently results from a joining of both the compact material and the compacts by a diffusion bond since the metal is heated to a temperature above the sintering temperature of the material. Our method may be used with compacts having various shapes and formed from various metals and, as indicated hereinafter in Table I, has been used successfully with titanium sponge and various titanium base alloys.

In the accompanying figure we have schematically shown apparatus which may be used in the performance of the method of our invention. The apparatus includes a furnace shell 1 having a dynamic vacuum seal 2 at the upper end and a static vacuum seal 3 at the lower end. Contact plate rods 4 and 5 extend into the furnace shell through the vacuum seals. A vacuum pump 6 is connected to the furnace shell by a conduit 7 having a seal 7a for exhausting the shell after the compacts have been placed in the shell in the desired arrangement. The compacts are indicated 8, 9, 10 and 11. The bottom compact 8 rests on a stationary cooled contact plate 12 which is carried by rod 5 connected with a power supply P. The upper end of upper compact 11 is in electrical contact with a vertically adjustable cooled contact plate 13 carried by rod 4 which is also connected to power supply P. The power supply P may provide either direct current or alternating current, and the specific power supply forms no part of our invention. Vacuum seal 3 surrounding rod 5 is static since plate 12 is stationary and rod 5 does not move, and vacuum seal 2 surrounding rod 4 is a dynamic seal since rod 4 is movable to permit adjustment of plate 13 in accordance with the overall length of the assembled compacts. A drive mechanism indicated generally at 14 is located at the upper end of rod 4 to adjust plate 13 to exert a force on the assembled compacts.

The force applied to the compacts by contact plate 13 and drive mechanism 14 need only be sufficient to insure a good electrical connection between plates 12 and 13 and the compacts and to insure that the abutting surfaces of the compacts are in contact. When the pressed compacts are not individually formed with the desired electrode shape, a plurality of segments will be placed with their longitudinal surfaces in abutment to form an electrode having approximately the desired shape; and in this case a lateral force may be applied to the assembly to maintain the longitudinal surfaces in contact. Regardless of whether the force is applied longitudinally or laterally, our method does not require the application of a large physical force to the assembled compacts. The force need only be sufficient to insure that the abutting surfaces of the compacts are in contact and that an electrical connection exists when resistance heating is used.

While the furnace shell 1 shown in the accompanying figure is in a vertical position, it should be understood that the method of our invention may also be carried out in a horizontal furnace. When a horizontal furnace is used, a support table is provided upon which the compacts rest during sintering. It should also be understood that the method of our invention may be practiced in a retort furnace heated either electrically or by combustion. An electrode can also be formed by our method in a consumable electrode arc furnace by arranging the compacts on the bottom of the crucible and bringing the ram contact plate into contact with the top of the upper compact. The method of heating and the type of furnace are not important so long as the metal in the compacts is raised to a temperature above its sintering temperature. A temperature between about 1200° F. and about 2000° F. will be sufficient depending upon the material to be sintered.

A typical sequence of operation for forming compacts into electrodes may be carried out in the following manner in a resistance type furnace such as shown in the accompanying figure. The compacts are loaded into the furnace and arranged in approximately the desired electrode shape after which the adjustable contact plate is brought into position with sufficient pressure to insure electrical connection with the compact assembly and contact between adjacent compact end surfaces. After the movable plate is properly adjusted, the furnace is closed, sealed and evacuated by pump 6; and high current, low voltage power is applied to the compact assembly to maintain it at a temperature above the self-diffusion temperature of the compact material for sufficient time to obtain the desired sintering. The furnace is then cooled while the assembly is still contained therein, and the sintered assembly is finally removed therefrom. During sintering the dimensions of the assembly undergo a slight change, but the change is small and the sintered assembly will approximate the desired electrode shape.

Compact assemblies have been fabricated according to our method by resistance heating in a vacuum furnace for periods varying from one-half hour to two hours at temperatures varying from 1450° F. to 1600° F. at the outer surface of the electrode and from 1650° F. to about 1950° F. on the inside of the electrode. The individual compacts were approximately 12 inches long and ½ octagon in lateral cross section having a cross sectional area of approximately 8 inches. The compacts were arranged into a full octagonal cross section in the furnace, and a number of lengths were sintered together to form assemblies ranging in total length from 2 to 7 feet. A number of the assemblies were tested for tensil strength after fabrication, and the typical tensile strength was in excess of 8,000 pounds in each case which gives an equivalent strength of over 500 pounds per square inch for each sintered joint.

Assemblies Nos. 1–6 were 2 feet in length and were sintered at 6,500 amperes and 4 volts for the time indicated. Assembly No. 7 was 5 feet in length and was sintered at 7,000 amperes and 6 volts. Assembly No. 8 was 7 feet in length and was sintered at 6,500 amperes and 7 volts at a longitudinal pressure along the assembly axis of only 25 p.s.i. The compact material and the conditions under which the assemblies were sintered as well as their tensile strength are shown in Table I.

TABLE I

| No. | Material | Sintering Time, Minutes | Temperature, °F. Outside | Temperature, °F. Inside | Furnace Pressure, Microns | Tensile Failure Load, Lbs. |
|---|---|---|---|---|---|---|
| 1 | Sponge | 120 | 1,600 | 1,770 | 300–1,100 | 8,750 |
| 2 | Sponge+25% scrap | 35 | 1,517 | | 630–5,000 | 11,000 |
| 3 | do | 120 | 1,480 | 1,700 | 150–3,500 | 12,800 |
| 4 | Ti-8-1-1 [1] | 60 | 1,480 | 1,750 | 60–325 | 12,100 |
| 5 | Ti-679 [2] | 60 | 1,460 | 1,700 | 55–280 | 11,800 |
| 6 | Ti-8Mn | 60 | 1,460 | 1,700 | 40–275 | 14,400 |
| 7 | Sponge | 80 | 1,450 | 1,650 | 50–525 | |
| 8 | do | 30 | 1,520 | 1,944 | 90–490 | |

[1] Ti-8 Al-1 Mo-1 V.
[2] Ti-2.25 Al-11 Sn-5 Zr-1 Mo-.2 Si.

As can be seen from Table I, our method may be used to successfully sinter compacts of different compositions, and the tensile strength of the sintered assembly is sufficiently high to permit utilization of the assembly as an electrode in consumable electrode melting. In fact, the tensile strength is considerably higher than that obtainable in an electrode formed by welding pressed compacts which is only about 200 p.s.i.

It is readily apparent that our method provides a rapid and inexpensive means by which a plurality of individual compacts may be formed into an electrode. Electrodes formed by our method have greater tensile strength than electrodes formed by fusion welding compacts, and a larger amount of scrap may be incorporated in the compacts than was possible heretofore.

While we have shown and described a preferred embodiment of our invention, it is to be understood that it may be carried out within the scope of the appended claims.

We claim:
1. Method of forming an electrode having high tensile strength from a plurality of pressed metal compacts selected from the group consisting of titanium and titanium base alloys comprising arranging said compacts in a furnace into an assembly approximating the desired electrode shape and maintaining adjacent surfaces of said compacts in contact, evacuating said furnace and heating said assembly to a temperature between the self-diffusion temperature of the compact metal and about 2000° F. for a period of time sufficient to sinter the compact material.

2. A method as set forth in claim 1 including applying pressure to said assembly parallel to the longitudinal axis thereof in an amount sufficient to maintain abutting end surfaces of said compacts in contact.

3. A method as set forth in claim 2 including applying pressure to said assembly perpendicular to the longitudinal axis thereof in an amount sufficient to maintain abutting longitudinal surfaces of said compacts in contact.

4. A method as set forth in claim 1 wherein said assembly is heated at a temperature of at least about 1200° F.

5. A method as set forth in claim 1 wherein said assembly is heated at a temperature between about 1200° F. and about 2000° F.

6. A method as set forth in claim 1 wherein said assembly is heated for at least about one-half hour.

7. A method as set forth in claim 1 wherein said assembly is heated for a period of between one-half hour and two hours.

8. A method as set forth in claim 1 including contacting each end of said compact assembly with electric current conducting means and passing electric current to said conducting means and said assembly, whereby said assembly is heated by the resistance of the compact metal to the passage of electric current therethrough.

References Cited

UNITED STATES PATENTS 2,703,750  3/1955  Cotter _____ 75—208 XR
3,031,300  4/1962  Deutsch _____ 75—226 XR BENJAMIN R. PADGETT, Primary Examiner.

A. J. STEINER, Assistant Examiner.

U.S. Cl. X.R.

75—214, 225

Disclaimer

3,416,919.—*Karl S. Snow*, Boulder City, Nev., and *Schuyler A. Herres*, Murray Hill, N.J. METHOD FOR FORMING ELECTRODES. Patent dated Dec. 17, 1968. Disclaimer filed Dec. 30, 1968, by the assignee, *Titanium Metals Corporation of America*.

Hereby enters this disclaimer to claims 1–8 of said patent.

[*Official Gazette April 29, 1969.*]